US012645888B2

(12) United States Patent
Jin

(10) Patent No.: US 12,645,888 B2
(45) Date of Patent: Jun. 2, 2026

(54) TOKEN-LEVEL ROUTING OF LARGE LANGUAGE MODELS AS EXTERNAL KNOWLEDGE MODELS

(71) Applicant: Tencent America LLC, Palo Alto, CA (US)

(72) Inventor: Lifeng Jin, Mill Creek, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 158 days.

(21) Appl. No.: 18/418,854

(22) Filed: Jan. 22, 2024

(65) Prior Publication Data

US 2025/0238623 A1      Jul. 24, 2025

(51) Int. Cl.
*G06F 40/35*      (2020.01)
(52) U.S. Cl.
CPC .................................... *G06F 40/35* (2020.01)
(58) Field of Classification Search
CPC .................................. G06F 40/35; G06F 40/30
See application file for complete search history.

(56) References Cited

U.S. PATENT DOCUMENTS 8,645,138 B1 * 2/2014 Weinstein ............... G10L 15/19
704/270.1
2022/0044134 A1 * 2/2022 Joy ........................ G06N 20/00
2022/0165288 A1 * 5/2022 Wang ...................... G10L 13/02
2024/0070752 A1 * 2/2024 Sato ................... G06Q 30/0631
2024/0126737 A1 * 4/2024 Madugula ............... G06F 40/30
2024/0385814 A1 * 11/2024 Fu .............................. G06F 8/35
2025/0225337 A1 * 7/2025 Yim ......................... G06F 40/40

OTHER PUBLICATIONS

Hugo Touvron et al., "Llama 2: Open Foundation and Fine-Tuned Chat Models", arXiv:2307.09288v2, 2023, 77 pages.
Long Ouyang et al., "Training language models to follow instructions with human feedback", arXiv:2203.02155v1, 2022, 68 pages.
Yung-Sung Chuang et al., "DOLA: Decoding By Contrasting Layers Improves Factuality in Large Language Models", arXiv:2309.03883v1, 2023, 23 pages.
Xiang Lisa Li et al., "Contrastive Decoding: Open-ended Text Generation as Optimization", arXiv:2210.15097v2, 2023, 25 pages.
Patrick Lewis et al., "Retrieval-Augmented Generation for Knowledge-Intensive NLP Tasks", arXiv:2005.11401, 2021, 19 pages.
Zhengbao Jiang et al., "Active Retrieval Augmented Generation", arXiv:2305.06983v2, 2023, 24 pages.

(Continued)

*Primary Examiner* — Darioush Agahi

(74) *Attorney, Agent, or Firm* — Sughrue Mion, PLLC

(57)      ABSTRACT

A method and apparatus comprising computer code configured to cause a processor or processors to receive an input question to the LLM, the LLM comprising a pretrained model and an aligned model, determine whether a portion of an unfinished response to the input question is factual, and answer the input question by at least adding to the unfinished response by a token-level router routing either to the pretrained model, based on determining that the portion is factual, or routing to the aligned model, based on determining that the portion is not factual.

16 Claims, 9 Drawing Sheets

(56)                    References Cited

OTHER PUBLICATIONS

Mikel Artetxe et al., "Efficient Large Scale Language Modeling with Mixtures of Experts Mikel", arXiv:2112.10684v2, 2022, 17 pages.
Hyung Won Chung et al., "Scaling Instruction-Finetuned Language Models", arXiv:2210.11416v5, 2022, 54 pages.
Keming Lu et al., "Routing to the Expert: Efficient Reward-guided Ensemble of Large Language Models", arXiv:2311.08692v1, 2023, 10 pages.
Mandar Joshi et al., "TriviaQA: A Large Scale Distantly Supervised Challenge Dataset for Reading Comprehension", arXiv:1705.03551v2, 2017, 11 pages.
Tom Kwiatkowski et al., "Natural Questions: A Benchmark for Question Answering Research", Transactions of the Association for Computational Linguistics, 2019, pp. 453-466, vol. 7.

* cited by examiner

200

300

301 Plain-text Data

302 Pretrained Model

303

304 305 306

Aligned Model

702     Token-level Router

703     Aligned Model

704

705

706     Parameterized Knowledge Models

707

800

TOKEN-LEVEL ROUTING OF LARGE LANGUAGE MODELS AS EXTERNAL KNOWLEDGE MODELS

BACKGROUND

1. Field

The present disclosure is directed to token-level routing of large language models as external knowledge models.

2. Description of Related Art

Large language models such as ChatGPT and Llama 2 go through pretraining and aligning stages in order to be helpful and useful AI tools, with the aligned model being the final product for the end users. Although aligning models to human preferences makes models safer and more helpful, it also costs the model's ability to correctly recall factual knowledge learned during the pretraining stage increasing its tendency to hallucinate incorrect facts and information. Furthermore, the aligned model cannot go back to the pretraining stage again once there is new and updated knowledge to learn, which means that the whole pretraining and aligning pipeline has to be executed again to update the models and it is expensive and very time-consuming.

The most popular way for training a large language model, such as ChatGPT and Llama 2 models, is to first pretrain a model with a huge amount of plain text and then finetune it with human-labeled data. In pretraining, the model tries to learn to predict the next word given some prefix words from plain text data such as books, essays, online forum posts and news articles. In finetuning, human-authored question-answer pairs are provided as training data for the model to learn how to respond to specific user requests. Furthermore, the finetuning process often includes aligning to human preferences in terms of helpfulness and harmlessness, asking the model to learn how to refuse to answer some dangerous questions or be more detailed for other questions. The model after pretraining is referred to as the pretrained model, and the model after the whole finetuning stage is referred to as the aligned model.

After the finetuning stage, the aligned model tends to be better at following human instructions, in other words providing more appropriate responses to human prompts or requests. However, the knowledge stored in the pretrained models is damaged by the aligning process, causing a sharp decrease in the performance of tasks related to factuality. This is often known as alignment tax, and is generally considered unavoidable in the training process.

In order to counter the alignment tax in factuality of the aligned models, many strategies were proposed. A family of decoding strategies assumes that the factuality of the model can be improved by distribution manipulation at inference time. This family of methods is limited by the fact that their hyperparameters are often dependent on specific datasets, which is unrealistic in real-world scenarios where user requests cannot be classified into datasets. Another family relies on looking up information online instead of relying on parameters of the trained model for knowledge representations. This approach is largely dependent on the quality of the retrieved texts, and cannot be applied to complex user requests where they are more than simple fact questions.

There are methods which connect multiple models together to achieve better performance. In some cases, such methods aim at increasing model capacity, i.e., the amount of information that can be stored inside model parameters, without increasing computation costs. They achieved this goal by routing computation inside a model so that for each request, despite being a larger model, the total number of activated parameters is the same. This is a different goal and has no guarantee of being more factual. Other methods may route different user requests based on the classification of tasks or domains with different submodels handling requests for specific tasks such as translation or sentiment analysis, or specific domains such as medical or financial domains. This is also a different goal and does not concern itself with factuality of the generated texts.

And for any of those reasons there is therefore a desire for technical solutions to such problems that arose in computer technology.

SUMMARY

There is included a method and apparatus comprising memory configured to store computer program code and a processor or processors configured to access the computer program code and operate as instructed by the computer program code. The computer program is configured to cause the processor implement receiving code configured to cause the at least one processor to receive an input question to the LLM, the LLM comprising a pretrained model and an aligned model, determining code configured to cause the at least one processor to determine whether a portion of an unfinished response to the input question is factual, and answering code configured to cause the at least one processor to answer the input question by at least adding to the unfinished response by a token-level router routing either to the pretrained model, based on determining that the portion is factual, or routing to the aligned model, based on determining that the portion is not factual.

According to exemplary embodiments, the pretrained model may be larger than the aligned model.

According to exemplary embodiments, the aligned model may be trained based on the pretrained model.

According to exemplary embodiments, the computer program code further comprises updating code configured to cause the at least one processor to update the pretrained model without updating the aligned model.

According to exemplary embodiments, determining whether the portion of the unfinished response to the input question is factual is based on model training comprising prompting a chat model to extract fact-related tokens from a question-answering dataset.

According to exemplary embodiments, prompting the chat model comprises prompting the chat model to find, and provide an output of, any of named entities, dates, numbers, documents, laws, and historical facts.

According to exemplary embodiments, prompting the chat model comprises prompting the chat model to provide the output in JavaScript Object Notation (JSON)-formatted strings.

According to exemplary embodiments, the token-level router is more likely to route to the aligned model than to the pretrained model.

According to exemplary embodiments, the token-level router is a binary classifier.

According to exemplary embodiments, possible outputs of the token-level router comprise a tag "A", indicating routing to the aligned model, and a tag "P", indicating routing to the pretrained model.

BRIEF DESCRIPTION OF THE DRAWINGS

Further features, nature, and various advantages of the disclosed subject matter will be more apparent from the following detailed description and the accompanying drawings in which:

FIG. 7 is a simplified diagram in accordance with embodiments;

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
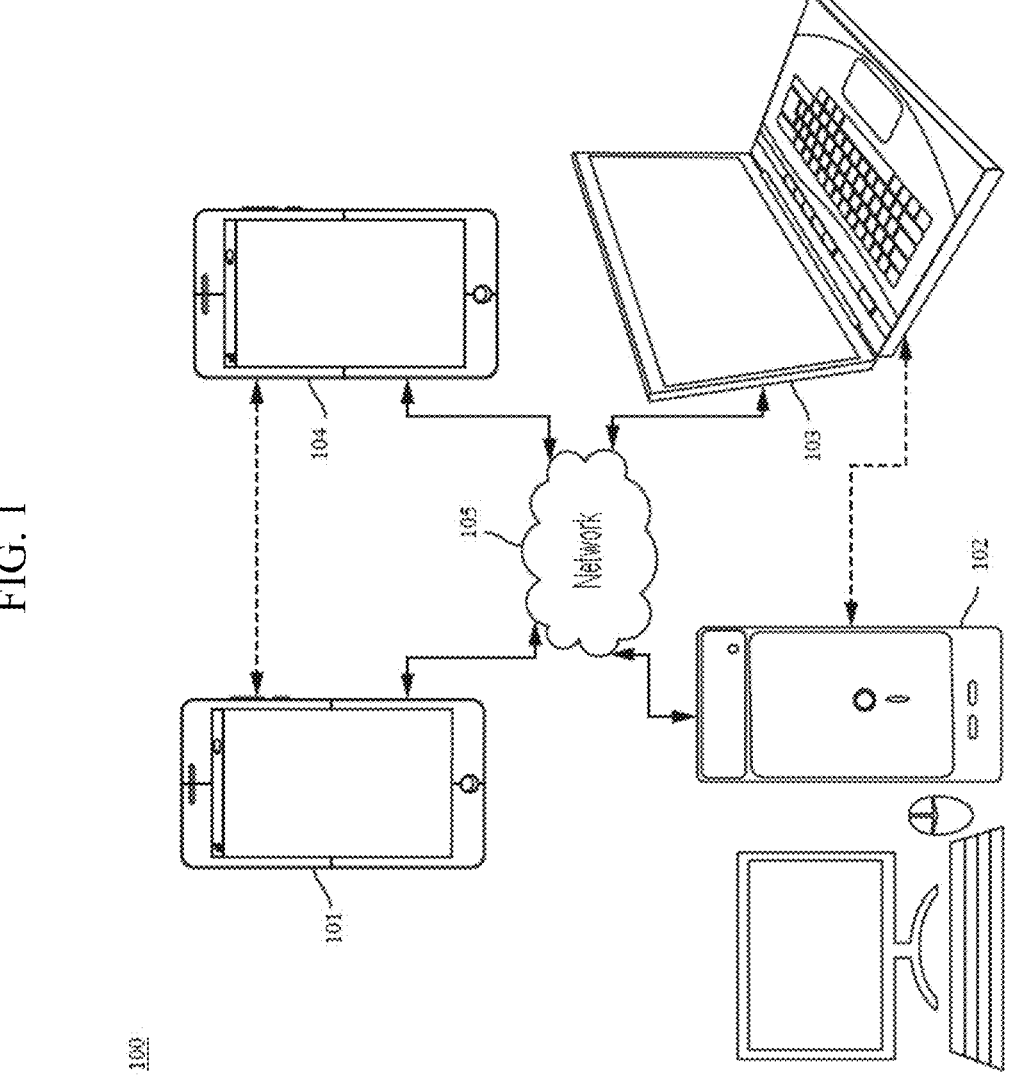
FIG. 1 is a schematic illustration of a diagram in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels.

Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
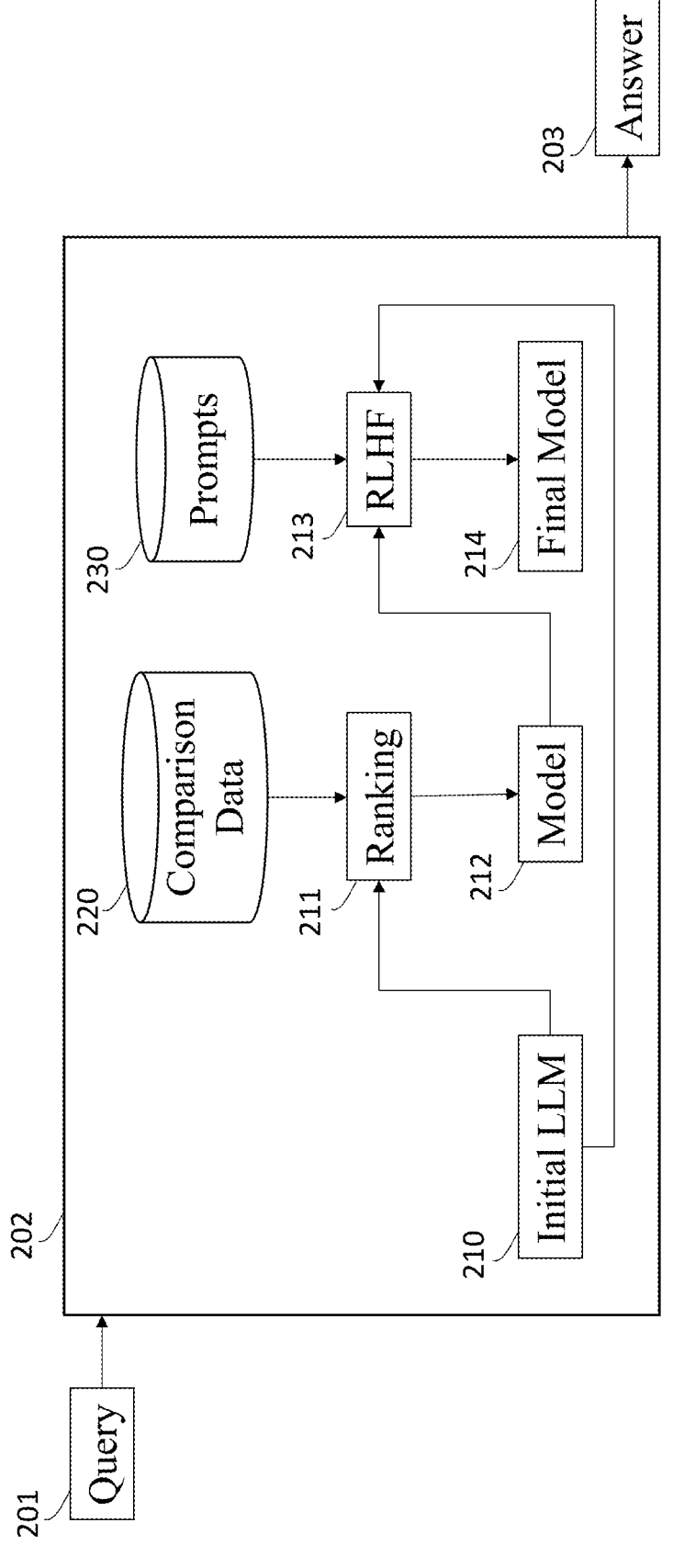
FIG. 2 is a simplified flow diagram in accordance with embodiments.

According to exemplary embodiments as shown in FIG. 2, an RLHF pipeline 200 may first train a model 212, which may be a reward model (RM) or an advantage model described further below, using standard ranking loss 211 on some comparison data 220. Each instance inside the comparison dataset, having the comparison data 220, usually contains several model outputs regarding a question, such as the query 201 to a GPT LLM or from the prompts 230, and the corresponding human-annotated ranking for the outputs, e.g., whether the human operator decided whether the answer 203 was appropriate or not. The RLHF pipeline 202 then uses the model 212 as the supervision to train the LLM to obtain the final model 213 for external use such as providing an answer 203 which could be output to a user in the form of a text, solution to a problem in the query 201, story, etc. Obviously, the model 212 serves as a critical role in the success of RLHF 213, having prompts 230 as input. The model 212 obtained by a ranking-loss training method can generally achieve quite satisfactory accuracy on the development set of reward modeling. However, if the ranking loss function only focuses on whether there is a difference, the function results in huge gaps in scores between samples from different tasks.

Accordingly, embodiments herein define the concept of "Proximal Policy Optimization (PPO) Alignment Tax" to describe a score-gap phenomenon, and it has been found by embodiments herein that Tax may be very unevenly paid (unfair) by each task. There has been found herein a significant difference between the RM means of different categories. This leads to a decrease in the stability of the training process, and even the so-called "Reward Hacking" phenomenon, such as not saying what should be said, and over-outputting what should not be said.

Therefore, embodiments may, within the context of the example 200 of FIG. 2, may directly train a model to capture Advantage (advantage) where an advantage A(s, a) is obtained by determining Q(s, a)−V(s), where s represents the state, a represents the action, Q(s, a) represents the expected reward of taking action a in state s, and V(s) represents the expected reward in state s.

Within the RLHF pipeline 202 of FIG. 2, an RM may be trained on a dataset of comparisons between several model outputs on the same input. Embodiments present labelers with K model outputs to rank. Embodiments produces $$\binom{K}{2}$$

comparisons for each question shown to the annotators. After collecting all annotated data, they train on all $$\binom{K}{2}$$

comparisons from each question as a single GPU-batch element. Specifically, the loss function for the reward model may be:

$$L = -\frac{1}{\binom{K}{2}} E_{(x,y_c,y_r)\sim D}[\log (\sigma (r_\theta (x, y_c) - r_\theta(x, y_r)))] \qquad \text{Eq. (1)}$$

where $r_\theta(x, y)$ is the scalar output of the model 212 for question x and model output y with parameter $\theta$, $y_c$ is the preferred output over $y_r$ and D is the dataset of human comparisons.

In a next step, the initial model M, initial LLM 210 in FIG. 2, may be finetuned using a PPO algorithm. For example, a bandit environment may adopted which presents a random question and model output to score just one time. Given the question and model output, the model 212 produces a reward and ends the episode. In addition, a per-token KL penalty from the initial model may be added at each token to mitigate over-optimization of the RM:

$$\text{objective } (\phi) = E_{x\sim D_{PPO}}\left[ r_\theta (x, y) - \beta \log \left( \frac{\pi (y|x)}{\pi^{init} (y|x)} \right) \right] \qquad \text{Eq. (2)}$$

where $\pi$ is the learned RL policy and $\pi^{init}$ is the initial model. The KL coefficient $\beta$ serves as a regularizer to prevent the learned RL policy from being far away from the initial model.

Embodiments herein solve "PPO Alignment Tax" problems where the model 212 results in significant difference in its scores between samples from different tasks 3 which otherwise leads to a decrease in the stability of the training process, and even the so-called "Reward Hacking" phenomenon, such as not saying what should be said, and over-outputting what should not be said.

Embodiments herein may alleviate the "PPO Alignment Tax" where the RM results in significant difference in its scores between samples from different tasks. Embodiments herein further provide two main modules which may be considered advantage modeling with entropy regularizer and adaptive FTX.

According to exemplary embodiments such as regarding advantage modeling, as model 212, with entropy regularizer, the loss function for the model 212 instead may be modeled by advantage as:

$$L = -\log (\sigma (a_\theta (x, y_c) - a_\theta (x, y_r))) - \qquad \text{Eq. (3)}$$
$$\sum_{y\in p(x)} \log (|r_\theta (x, y) - E [r_\theta(x, y)]| - m (x))$$

where the first term $-\log (\sigma(a_\theta(x, y_c)-a_\theta(x, y_r)))$ is the same as RM training described above in FIG. 2, and the later term models the average model performance for input question x, such as from the query 201 or prompts 230.

Figure 3:
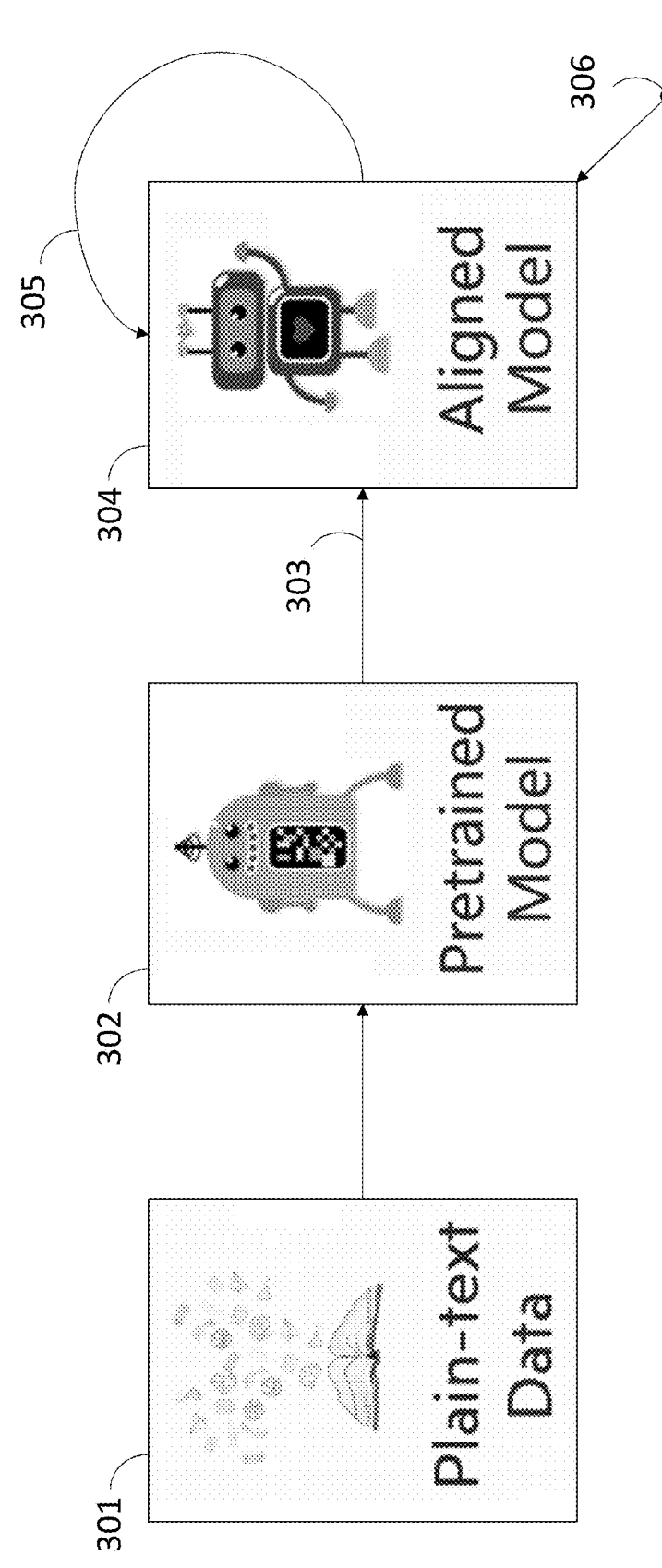
FIG. 3 is a simplified diagram in accordance with embodiments.
Figure 4:
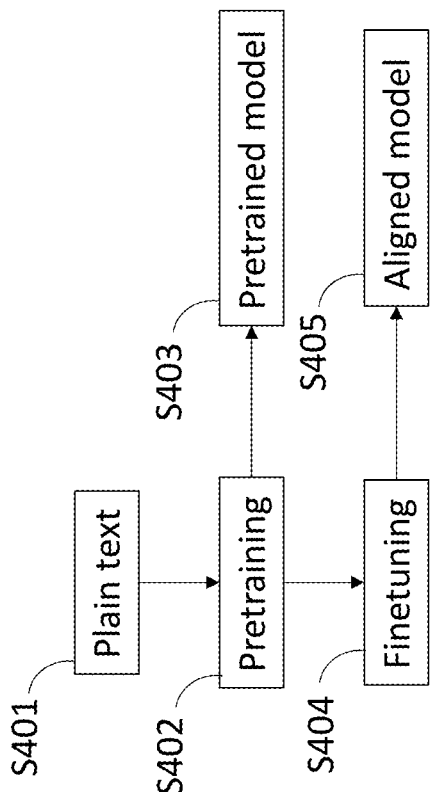
FIG. 4 is a simplified flow diagram in accordance with embodiments.

Viewing examples 300 and 400 of FIGS. 3 and 4, a most popular way for training a large language model, such as ChatGPT and Llama 2 models, has been to first pretrain S492 a model with a huge amount of plain text 301, obtained at S401, and then finetune at S404 it with human-labeled data. In pretraining at S402, the model tries samples 306 and tries to learn to predict the next word given some prefix words from plain text data such as books, essays, online forum posts and news articles. In finetuning at S404, human-authored question-answer pairs 305 are provided as training data for the model 304 to learn how to respond to specific user requests. Furthermore, the finetuning process at S404 often includes aligning to human preferences in terms of helpfulness and harmlessness, asking the model to learn how to refuse to answer some dangerous questions or be more detailed for other questions. The model obtained at S403 after pretraining is referred to as the pretrained model 302, and the model obtained at S405 after the whole finetuning stage is referred to as the aligned model 304.

After the finetuning stage S404, the aligned model 304 tends to be better at following human instructions, in other words providing more appropriate responses to human prompts or requests. However, the knowledge stored in the pretrained model 302 is damaged by the aligning process, causing a sharp decrease in the performance of tasks related to factuality. This is often known as alignment tax 303, and is generally considered unavoidable in the training process.

Figure 5:
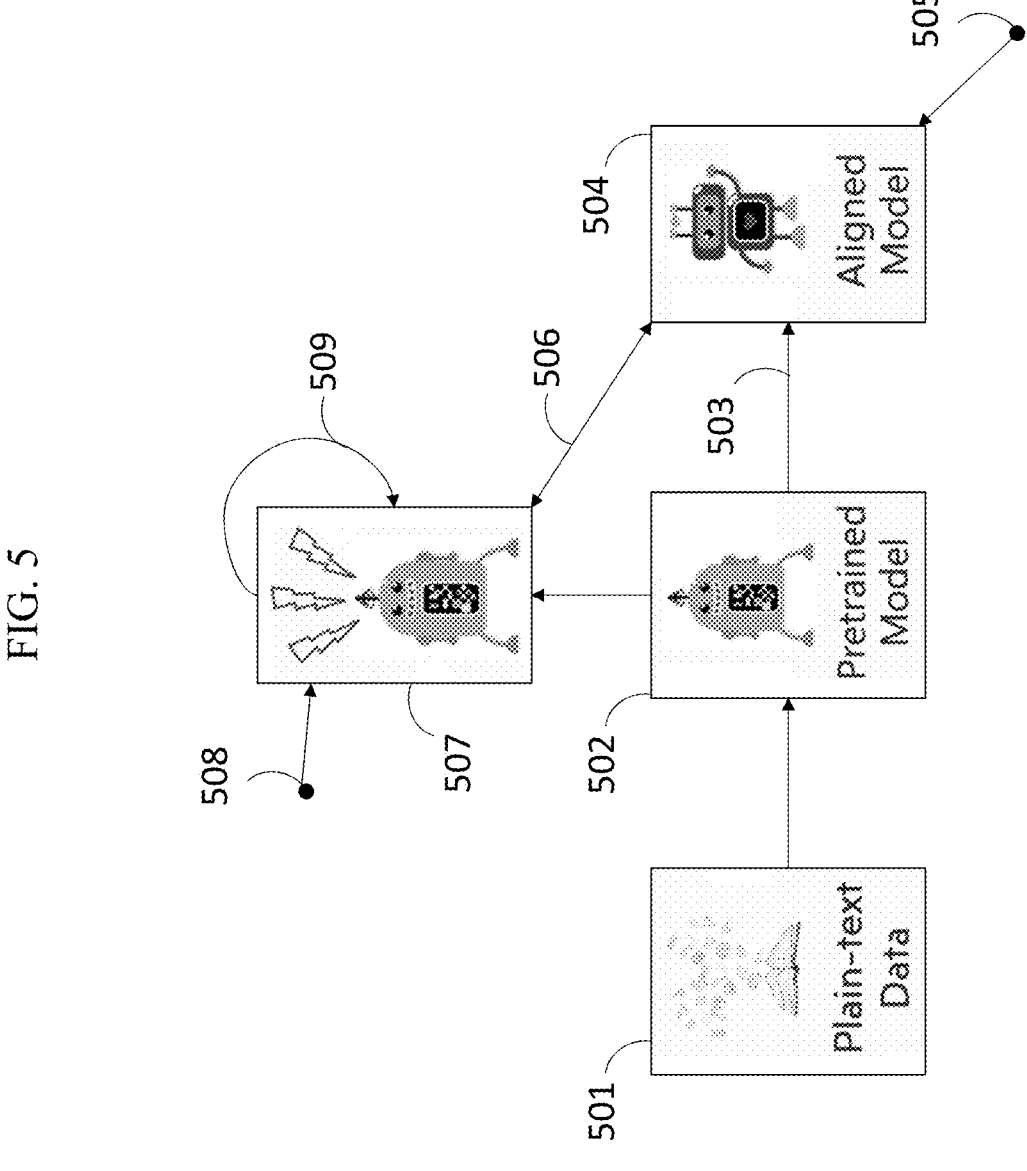
FIG. 5 is a simplified diagram in accordance with embodiments.
Figure 6:
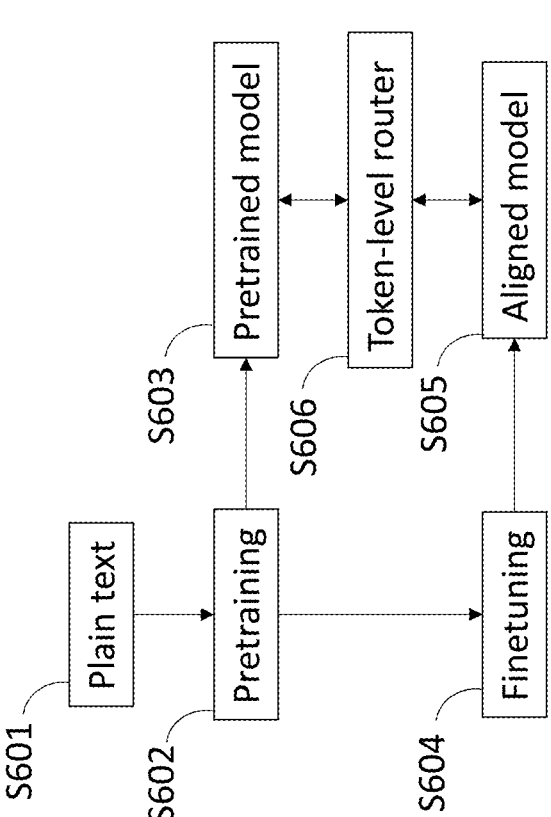
FIG. 6 is a simplified flow diagram in accordance with embodiments.
Figure 7:
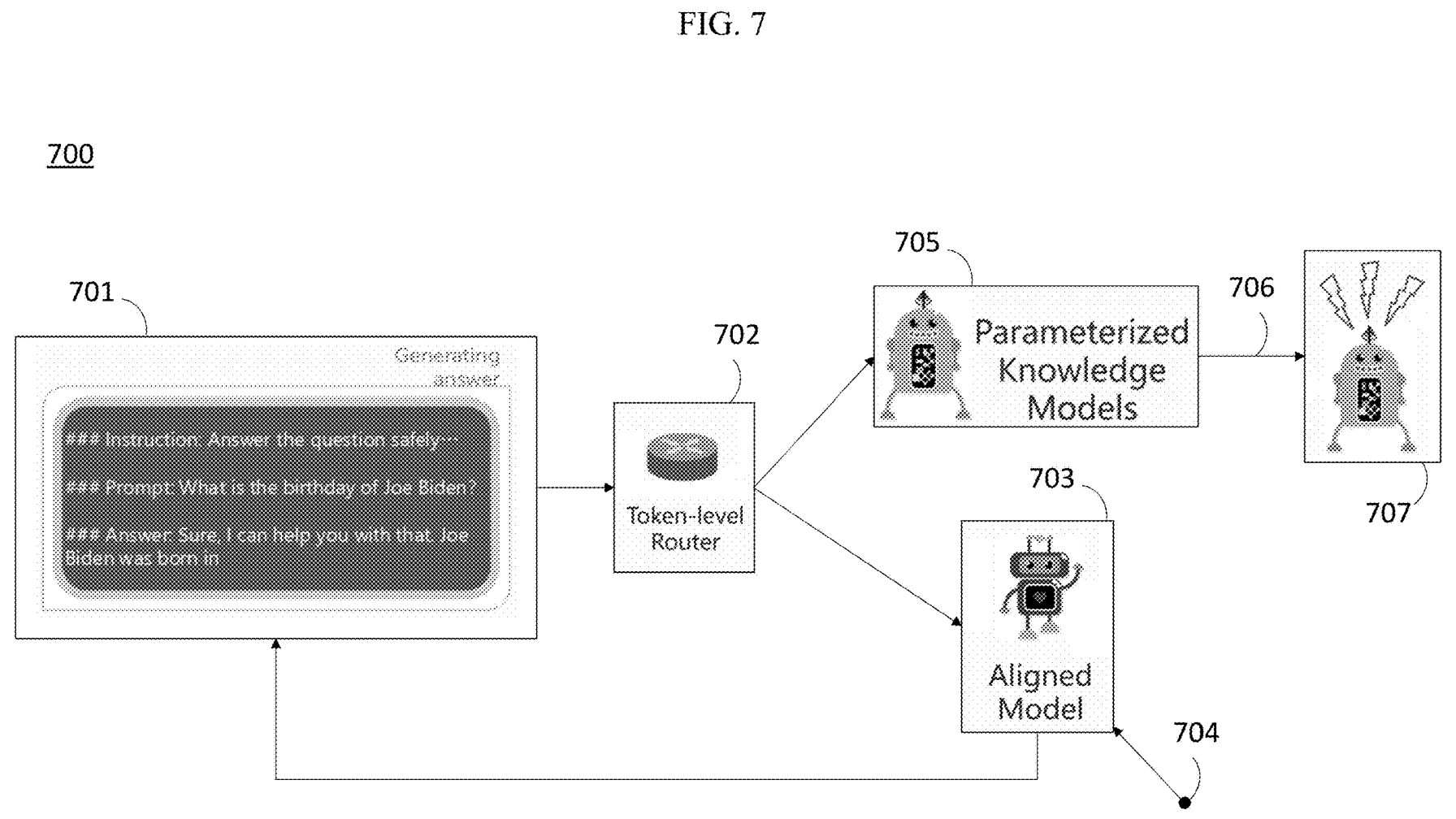

Therefore, to solve those technical problems, embodiments herein provide a token-level router, such as token-level router 702 of FIG. 7, to connect a pretrained model 502 and an aligned model 504 together, as can also be seen by steps S603, S606, and S605 of FIG. 6. The steps S601, S602, S603, S604, S605 may be the same or similar to the embodiments described above for S S402, S403, S404, and S405. Viewing examples 500 and 600 of FIGS. 5 and 7, the pretrained model 502 and the aligned model 504 may be trained using the typical training procedure described above, such as with FIGS. 3 and 4 but, e.g., with plain-text data 501, a pretrained model 502, an alignment tax 503, an aligned model 504, possible sampling 505 and with factual knowledge 506 between the aligned model 504 and a deterministic greedy decoder 507 to which a greedy input 508 and possible knowledge updates 509 may be applied, with the aligned model being the usual one serving the users such as with Query 201 and Answer 203 of FIG. 2.

According to embodiments, the function of the token-level router 702 is to, at S606, decide when to use which model, be it the pretrained model 502 from S603 or the aligned model 504 from S605. Because of the high factuality, the pretrained model 502 is responsible for generating factuality-related tokens, where the aligned model 504 is responsible for all the other tokens. The token-level router 702 may be a binary classifier with the input being the prefix of the generation up to the current time step, and the task of the router 702 is to decide if, given an unfinished response, such as in the Answer of element 701, the next token that is waiting to be generated is fact-related or not. If it is fact-related, then the pretrained model 502 is called to generate the next token. If not, then the aligned model 504 is called to generate the next token. After generating a token, the cycle repeats and the router 702 is called again with the newly updated prefix to decide which model to use. As such, example 700 of FIG. 7 represents a pipeline of such features.

When called, the sampling strategies are different for the pretrained model 502 and aligned model 504. The sampling strategy is usually preset or set by the users, and so, embodiments may not change anything there. The embodiment of FIG. 2 is employed according to exemplary embodiments. However, since the pretrained model 502 is separate from the aligned model 504, the sampling strategy for the fact-related tokens can now be decided freely by embodiments herein, and this strategy may be used by embodiments in the deterministic greedy decoding 507, so that the fact-related tokens are not impacted by sampling at all.

The example 700 of FIG. 7 shows the generation pipeline. Given a prefix shown in the box 701, because the next token is predicted to be a date, the token-level router 702 routes the generation to the pretrained model at element 705 for greedy decoding at element 707, which corresponds to the deterministic greedy decoder 507. If the next token is predicted to be not fact-related, then the token-level router 702 routes the generation to the aligned model 703 with sampling decoding 704.

Figure 8:
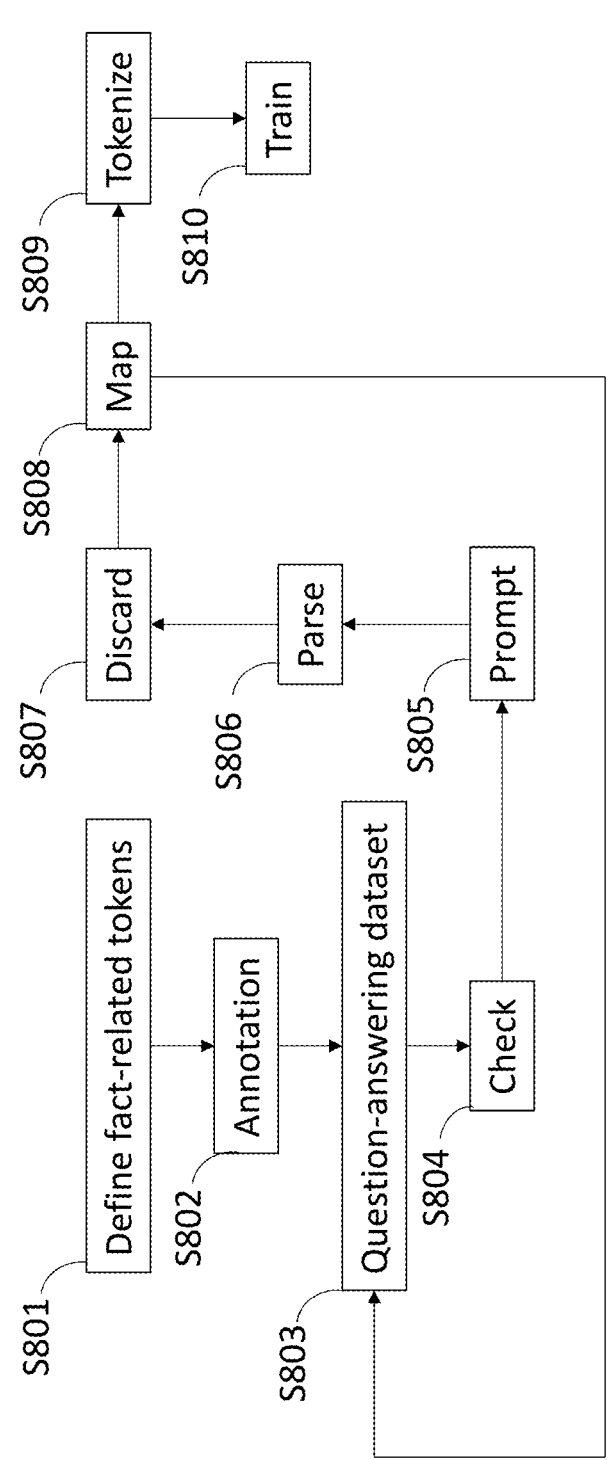
FIG. 8 is a simplified flow diagram in accordance with embodiments.

As for a dataset creation for such embodiments, see the example 800 of FIG. 8. Since the token-level router 702 needs to be trained for predicting fact-related tokens, embodiments define fact-related tokens to be tokens that are names (person, location, institution, publication etc.), numbers (numbers, dates, years etc.), laws, documents, historical and natural facts and other critical information. The definition is intentionally vague and the annotation process S802 is done automatically by using a large language model.

For the routing decision dataset, embodiments start with a question-answering dataset S803 where such as one having collected answers to 150,000 questions from a Llama 2 70B chat model for example, which is an aligned model from the pretrained Llama 2 70B model. Embodiments may check, at S804, the answers to these questions to make sure that they are correct answers. And embodiments may, at S805, then prompt the chat model itself to extract the fact-related tokens using the following prompt:

Find named entities, dates, numbers, documents, laws, historical and natural facts and other critical factual information from the passage below, and output in JSON format:

{answer}, where the {answer} part is replaced by the answers the chat model generates.

And the chat model may give responses as follows.

---

{"named entities": ["Norman Fairclough", "Critical Discourse Analysis (CDA)", "Marxism", "critical theory", "poststructuralism"], "dates": ["1989"], "documents": ["Language and Power"], "laws": [ ], "historical facts": [ ], "natural facts": [ ], ...}.

---

Since such responses are generally JSON-formatted strings which can be readily parsed by JSON parsers, at S806, and the ones which do not follow the format cannot be parsed and therefore are discarded at S807. Based on the pseudo-annotation provided by the chat model, embodiments map, at S808, the extracted the spans such as Norman Fairclough back into the answer and identify the prefix that comes before the spans. In other words, embodiments identify a prefix of text where if the token-level router 702 sees that prefix, then the token-level router 702 knows that it needs to predict that fact-related tokens are coming up and that the generation needs to come from the pretrained model 705 instead of the aligned model 703. Embodiments also, at S808, map the end of span plus the prefix back into the answer, identifying the end of the fact-related tokens where the generation should be handed back to the aligned model 703. The training data format is a pair of a sentence and a tag sequence, where the sentence is tokenized with the tokenizer of the aligned model, and the tag sequence is a same-length sequence of tags "A" or "P", meaning if the generation should come from the aligned model 703 or the pretrained model 705 for a token at S809.

With the training dataset, the training at S810 is a sequence prediction task, where for each position in a sequence, a decision has to be predicted. A Llama 2 13B model may be used as the starting model for the token-level router 702, and the created dataset may be used to continue training the starting model for 3000 steps, with the batch size of each step being 128 and the learning rate being $2*10^{-5}$. According to embodiments, the trained model has an accuracy of 0.75 for all tags and an F1 score of 0.65 for the "A" tag.

During inference according to embodiments herein, the number of tokens predicted as "P" may be about 5% of all tokens, which indicates that only 5% of the time the pretrained model 705 is called for generation, showing that the instruction following abilities of the aligned model 703 is not impacted by the token-level router 702, and the additional computation cost may be considered small.

Evaluation of embodiments herein are described below using two different scenarios.

The first scenario was that the token-level router 702 connects a pretrained and an aligned model of the same size, and a comparison was done between the results of the routed models to the models when used individually. It was expect that the routed models would perform better than the aligned model by itself, and get close to the performance of the pretrained model. Note that because the pretrained model has very weak instruction following abilities, it cannot be served directly to the users.

The second scenario was that a small aligned model was connected with a large pretrained model to show that the small model can exploit facts and knowledge stored inside the large model, but the overall computation cost is still small compared to using the large model only.

The datasets which those scenarios were conducted were on TriviaQA, NaturalQuestions and Wiki2019B (an in-house dataset which contains questions from Wikipedia about entities prior to 2019), all of which are fact-based question-answering datasets. The metric used in the evaluation is 'contain answer', which means whether the correct answer is within the generated response from the model or not. This will be referred to as accuracy in the following analysis.

The first two sections of the Table 1 below show the performance numbers of the routed models of Llama 2 70B models, and the Llama 2 13B models. The routed models are higher in accuracy for all datasets compared to the aligned model, indicating that the routing mechanism is very effective in extracting the fact-related tokens out from the pretrained model.

The last section of Table 1 below shows the performance numbers of the routed models of a Llama 2 7B aligned model connected with a Llama 2 70B pretrained model. The routed models are much higher in accuracy for all datasets compared to both the aligned model and the pretrained model, indicating again the advantage of the routing mechanism proposed in this work.

TABLE 1

|  |  | NQ | TQA | T2019B |
|---|---|---|---|---|
| Llama 2 70B | 70B Aligned | 46.37 | 82.54 | 52.09 |
|  | 70B Pretrained-70B Aligned | 51.02 | 70B Pretrained-70B Aligned | 51.02 |
|  | 70B Pretrain | 52.68 | 91.37 | — |
| Llama 2 13B | 13B Aligned | 38.91 | 73.62 | 44.70 |
|  | 13B Pretrained-13B Aligned | 44.01 | 80.59 | 47.39 |
|  |  | (+5.1) | (6.97) | (+3.69) |
|  | 13B Pretrain | 42.77 | 83.39 | — |
| Routed model | 7B Aligned | 35.26 | 66.68 | 34.54 |
|  | 70B Pretrained- | 43.10 | 80.18 | 40.34 |

TABLE 1-continued

|  | NQ | TQA | T2019B |
|---|---|---|---|
| 7B Aligned | (+7.84) | (+13.5) | (+5.8) |
| 7B Pretrain | 38.33 | 76.80 | — |

As such, advantages of embodiments herein are that the high performance of the pretrained model can now be exploited by the aligned model in generating more factual responses, and the decoupling also frees the pretrained model to be different from the aligned model, enabling connecting models with different sizes together. Because larger models tend to remember facts better than smaller models, connecting a small aligned model to a large pre-trained model can boost the performance of the aligned model beyond its capability of factual knowledge. Because the number of fact-related tokens is small compared to the number of tokens in a complete response, the larger model is only called a few times in generation, therefore the generation speed is also increased compared to only using the larger model for pretraining and aligning.

Further, advantages according to example embodiments herein also include that sampling has very limited impact on the fact-related tokens, which helps the generated response to be even more factual and not affected by user-chosen sampling strategies, and also, the pretrained model can freely receive updates, changes and modifications without any impact to the performance of the aligned model. That is, the fact-related tokens may be always updated to the current knowledge.

In summary the alignment process is a necessary process in which the pretrained model learns to follow human instructions to perform various tasks. However, the alignment process inflicts damage to the knowledge stored in the pretrained model, rendering the aligned model being weaker in factuality compared to the pretrained model. Embodiments herein exploit the pretrained model such that such performance can be regained from the pretrained model, resulting in a model higher in factuality without any negative impact to the instruction following abilities.

Further, the aligned model typically is used by users with sampling, where the generated text is sampled from a distribution each time a user interacts with the aligned model. This common practice greatly boosts the diversity of the generated responses compared to deterministic greedy decoding, but also induces inaccuracies in model replies, because fact-related information, such as birthdays or historical events, should not be sampled. Any sampling done during inference is likely to be harmful for the factuality of the aligned model. Therefore, embodiments herein reduce greatly the impact of using sampling to factuality.

Further, the knowledge inside the aligned model, once the training is finished, could not be updated using pretraining without significant damage to its instruction following abilities. However, the model and its knowledge needs to be updated, preferably very frequently, to accommodate the news, findings and breakthroughs the fast-changing world presents. The common pipeline is slow in that it can only be applied once every few months. And therefore, embodiments herein allow for improved updating the knowledge in the model every day to every couple of days, so that the model is always up-to-date with its knowledge of the world. That is, the fact-related tokens may be always updated (e.g., at element 509) to the current knowledge.

The techniques described above, can be implemented as computer software using computer-readable instructions and physically stored in one or more computer-readable media or by a specifically configured one or more hardware processors. For example, FIG. 9 shows a computer system 900 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
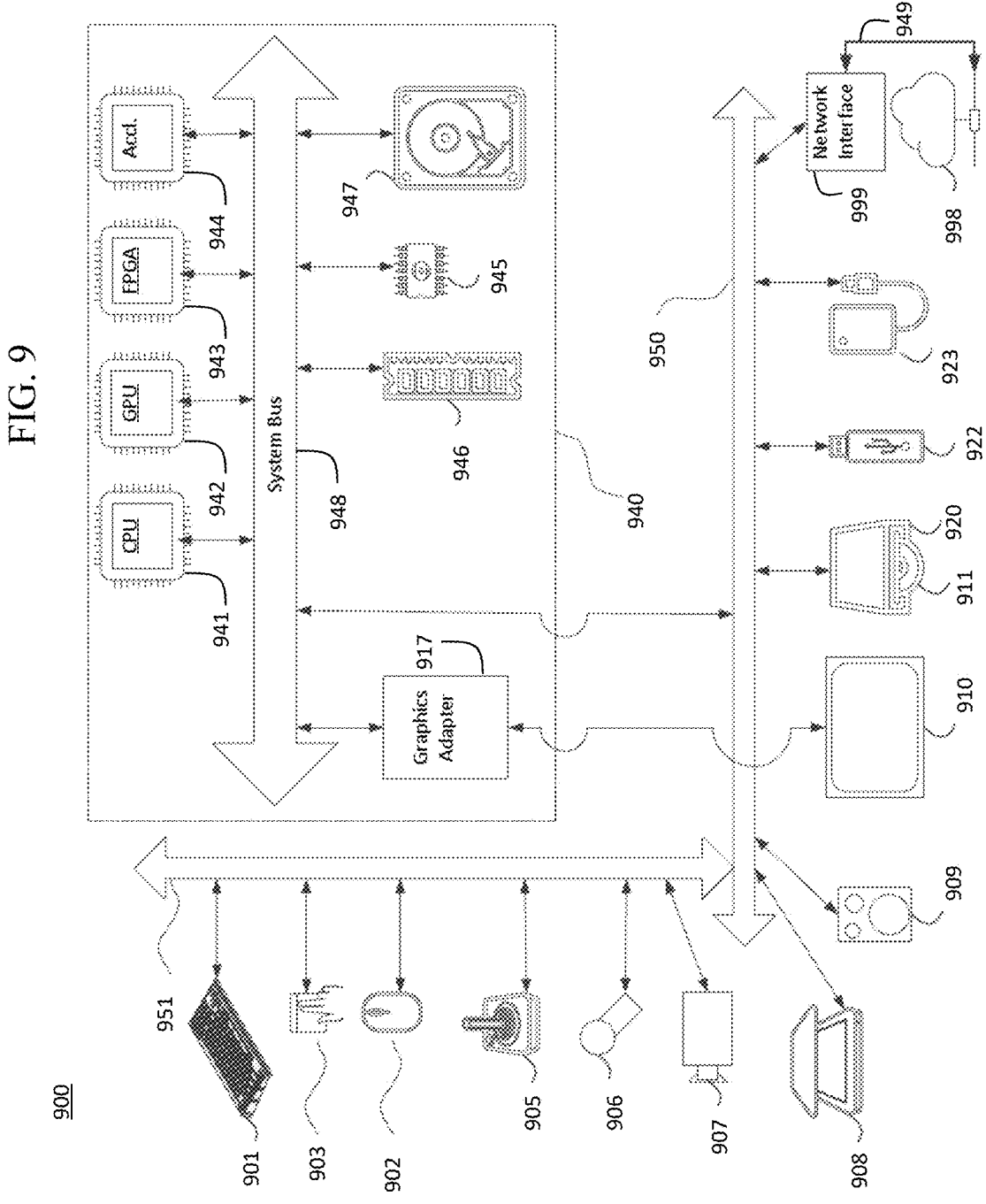
FIG. 9 is a simplified illustration in accordance with embodiments.

The components shown in FIG. 9 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, joystick 905, microphone 906, scanner 908, camera 907.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, or joystick 905, but there can also be tactile feedback devices that do not serve as input devices), audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD 911 or the like media, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface 999 to one or more communication networks 998. Networks 998 can for example be wireless, wireline, optical. Networks 998 can further be local, wide-area, metropolitan, vehicular and industrial, real-time, delay-tolerant, and so on. Examples of networks 998 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 998 commonly require external network interface adapters that attached to certain general-purpose data ports or peripheral buses (950 and 951) (such as, for example USB ports of the computer system 900; others are commonly integrated into the core of the computer system 900 by attachment to a system bus as described below (for example Ethernet interface into a PC computer system or cellular network interface into a smart-phone computer system). Using any of these networks 998, computer system 900 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 940 of the computer system 900.

The core 940 can include one or more Central Processing Units (CPU) 941, Graphics Processing Units (GPU) 942, a graphics adapter 917, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieval to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for a large language model (LLM), the method performed by at least one processor and comprising:
   receiving an input question to the LLM, the LLM comprising a pretrained model and an aligned model;
   determining, while a response to the input question is being generated and before the response is fully generated, whether a portion of an unfinished response to the input question is factual, the portion of the unfinished response represents a next token waiting to be generated for the response; and
   answering the input question by further at least partly generating the response based on at least adding to the unfinished response by a token-level router routing either to the pretrained model, based on determining that the portion is factual, or routing to the aligned model, based on determining that the portion is not factual,
   wherein the aligned model is trained based on the pretrained model, and the method further comprises updating the pretrained model without updating the aligned model.

2. The method according to claim 1, wherein the pretrained model is larger than the aligned model.

3. The method according to claim 1, wherein determining whether the portion of the unfinished response to the input question is factual is based on model training comprising prompting a chat model to extract fact-related tokens from a question-answering dataset.

4. The method according to claim 3, wherein prompting the chat model comprises prompting the chat model to find, and provide an output of, any of named entities, dates, numbers, documents, laws, and historical facts.

5. The method according to claim 4, wherein prompting the chat model comprises prompting the chat model to provide the output in JavaScript Object Notation (JSON)-formatted strings.

6. The method according to claim 1, wherein the token-level router is more likely to route to the aligned model than to the pretrained model.

7. The method according to claim 1, wherein the token-level router is a binary classifier.

8. The method according to claim 7, wherein possible outputs of the token-level router comprise a tag "A", indicating routing to the aligned model, and a tag "P", indicating routing to the pretrained model.

9. An apparatus for a large language model (LLM), the apparatus comprising:
 at least one memory configured to store computer program code;
 at least one processor configured to access the computer program code and operate as instructed by the computer program code, the computer program code including:
  receiving code configured to cause the at least one processor to receive an input question to the LLM, the LLM comprising a pretrained model and an aligned model;
  determining code configured to cause the at least one processor to determine, while a response to the input question is being generated and before the response is fully generated, whether a portion of an unfinished response to the input question is factual, the portion of the unfinished response represents a next token waiting to be generated for the response; and
  answering code configured to cause the at least one processor to answer the input question by further at least partly generating the response based on at least adding to the unfinished response by a token-level router routing either to the pretrained model, based on determining that the portion is factual, or routing to the aligned model, based on determining that the portion is not factual, wherein the aligned model is trained based on the pretrained model, and the computer program code further comprises updating code configured to cause the at least one processor to update the pretrained model without updating the aligned model.

10. The apparatus according to claim 9, wherein the pretrained model is larger than the aligned model.

11. The apparatus according to claim 9, wherein determining whether the portion of the unfinished response to the input question is factual is based on model training comprising prompting a chat model to extract fact-related tokens from a question-answering dataset.

12. The apparatus according to claim 11, wherein prompting the chat model comprises prompting the chat model to find, and provide an output of, any of named entities, dates, numbers, documents, laws, and historical facts.

13. The apparatus according to claim 12, wherein prompting the chat model comprises prompting the chat model to provide the output in JavaScript Object Notation (JSON)-formatted strings.

14. The apparatus according to claim 9, wherein the token-level router is more likely to route to the aligned model than to the pretrained model.

15. The apparatus according to claim 9, wherein the token-level router is a binary classifier.

16. A non-transitory computer readable medium storing a program causing a computer to:
 receive an input question to the LLM, the LLM comprising a pretrained model and an aligned model;
 determine, while a response to the input question is being generated and before the response is fully generated, whether a portion of an unfinished response to the input question is factual, the portion of the unfinished response represents a next token waiting to be generated for the response; and
 answer the input question by further at least partly generating the response based on at least adding to the unfinished response by a token-level router routing either to the pretrained model, based on determining that the portion is factual, or routing to the aligned model, based on determining that the portion is not factual,
 wherein the aligned model is trained based on the pretrained model, and the program further causes the computer to update the pretrained model without updating the aligned model.

* * * * *